April 29, 1969  R. T. LUEDEMAN  3,441,892

THERMALLY-CONTROLLED RESISTORS

Filed June 27, 1967

INVENTOR.
Robert T. Luedeman
BY
Jerry M Presson
ATTORNEY

# United States Patent Office 3,441,892
Patented Apr. 29, 1969

3,441,892
THERMALLY-CONTROLLED RESISTORS
Robert T. Luedeman, Metuchen, N.J., assignor to Weston Instruments, Inc., Newark, N.J., a corporation of Delaware
Filed June 27, 1967, Ser. No. 649,268
Int. Cl. H01c 7/04
U.S. Cl. 338—23                12 Claims

ABSTRACT OF THE DISCLOSURE

An oval bead composed of a material having both good thermal conductive and electrical insulative properties is joined to a discrete surface portion of a layer of electrical insulation encapsulating a resistor having a high negative temperature coefficient of resistance. The bead is of small size and embeds typically two heater wires in small spaced-apart relationship and provides (1) a heat sink of negligible size and (2) a common thermal conductive path to heat transfer between the heater wires and the discrete surface portion of the layer of electrical insulation.

---

This invention relates generally to thermally-controlled resistor devices having a relatively high temperature coefficient of resistance and, more particularly, to indirectly resistance-heat thermistor devices.

The term "thermistor" is commonly used by those working in the electrical arts as descriptive of thermally-controlled resistors, the resistance value of which varies substantially as a function of resistor temperature. The resistance of thermistors is inversely related to resistor temperature and, consequently, the resistance of these devices decreases with increasing temperature and, conversely, increases with decreasing temperature. Thus, by controlling or varying the temperature of the thermistor, its resistnace value may also be controlled or varied.

Any one of several techniques may be employed to control or vary the temperature of thermistors. In the case of the "indirectly heated" thermistors, thermistor heating is most usually effected through the application of electrical current to one or more relatively high resistance wires. These "heater wires," as they are commonly termed, do not penetrate or touch the body of the resistance material comprising the thermistor device, but rather, are maintained in a relatively close proximity to the thermistor body; the heat transfer between the heater wire or wires and the resistor body being effected through thermal conduction therebetween through a medium affording electrical insulation to the heater wire or wires. In contrast, "directly heated" thermistors usually have current applied directly to two electrodes which are embedded in the thermistor body to which external circuit connections may be made. The present invention is directed specifically to thermistors of the indirectly resistance-heated type.

Many, if not most, commercial applications require that the thermistor have as fast a response as possible to changes in temperature caused by variations in the effective value of the current applied to the heater wire or wires. The "speed" of the thermistor device is an inverse function of the thermal inertia of the device; increasing with decreasing thermal inertia and decreasing with increasing thermal inertia.

The thermal inertia of indirectly heated thermistor devices bears a direct relationship to the volume of electrical insulating material which is used to electrically insulate the heater wire or wires from the thermistor body, the connecting leads from the heater wire or wires and individual heater wires from one another. In prior art thermistor devices, the heater wire or wires are typically embedded in a relatively large volume of electrical insulating material and heat transfer between the wire or wires to the thermistor body is thus effected through the heat sink provided by the electrical insulating material. In such prior art devices, the electrical insulation material used to embed and electrically insulate the heater wire or wires is typically uniformly distributed as an additional layer or coating over the entire outer surface of the device including the thermistor body. Manifestly, for any given size of thermistor body and with all other parameters, such as electrical and thermal conductance assumed constant, the less the volume of electrical insulating material the lower the thermal inertia of the thermistor device and the faster its speed of response to changes in heater current value.

Prior art thermistor devices employing two or more heater wires normally position the heater wires symmetrically with respect to the thermistor body. Thus, a substantially oval-shaped thermistor body typically has two heater wires positioned diametrically opposite one another. Two essentially distinct thermal conductive paths are thus provided between the heater wire and despective adjacent surfaces of the thermistor body. Manifestly, the two thermal conductive paths include the insulation material of the sheath which is interposed between each heater wire and its corresponding adjacent surface of the thermistor body. The sheath often introduces thermal conductive unbalances between each heat conductive path by reason of encapsulating air bubbles or other types of extraneous matter which affect the thermal loss characteristics of each thermal path slightly differently. The presence of a thermal unbalance between the two thermal conductive paths is particularly bothersome in those instances where the resistance value of the thermistor body is to be the same with equal values of heater current applied to the two heater wires in a sequential manner. Under these conditions, although the two heater wires may have identical resistances, a thermal unbalance in the heat conductive paths between each wire and the thermistor body would cause the thermistor body to rise to a different temperature level, and hence to a different resistance level, with each heater current applied sequentially to a corresponding heater wire.

It is an object of this invention to provide a thermistor device of the indirectly resistance-heated type having a faster response to variations in heater current than known prior art devices of this type.

Another object of this invention is to provide an indirectly heated thermistor device including a thermistor body, the device having a very low thermal inertia to variations in thermal energy caused by variations in current flow through at least one electrical resistance element mounted in heat conducting relationship with the thermistor body.

Yet another object of this invention is to provide a thermistor device including a body having a high resistance-temperature coefficient and at least two current-carrying heater wires for supplying thermal energy to the body, whereby thermal unbalances between the conductive paths that thermally couple each heater wire to the body are practically nullified.

According to this invention, an indirectly heated thermistor device includes a thermistor body sheathed by a layer of electrical insulating material having a relatively good thermal conductance. A pair of electrodes, embedded in the thermistor body, extend from the sheath to form connecting leads to electrical circuitry which is to be controlled by thermally-induced changes in resistance of the thermistor body. A bead-like element also formed of an electrical insulating material having a good thermal conductance is suitably affixed to a discrete portion of the outer surface of the insulating sheath; the discrete portion having a surface area substantially less than the total surface area of the sheath. A pair of heater wires are embedded in the element in close proximity to one another and the thermal energy radiating from the heater wires is rapidly transferred from the element, through the heat conductive interface to the thermistor body, with the paths of thermal conduction to the thermistor body for both heater wires being essentially identical.

Although the bead-like element and the insulating sheath provide sinks to the thermal energy radiated by the heater wires embedded in the element, in accordance with this invention, the volume or masses of both the element and the sheath may be made minimal consistent with providing respective satisfactory electrical insulation to the heater wires embedded in the element and to the thermistor body covered by the sheath. Hence, the thermal inertia of the bead-like element and the insulating sheath is also made minimal.

For a better understanding of the present invention, together with other and further objects thereof, reference may be had to the following description taken in connection with the accompanying drawings, the scope of the invention being pointed out in the appended claims.

Referring to the drawings.

Figure 1:
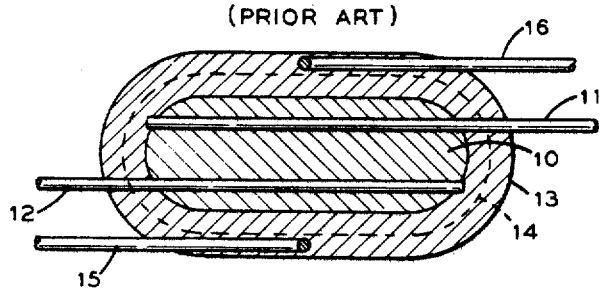
FIGURE 1 is a sectional side view taken substantially through a plane of symmetry of a typical prior art thermistor device of the indirectly resistance-heated type.

Referring to FIGURE 1 of the drawing, the prior art thermistor illustrated thereby typically comprises a thermistor body or bead 10 of generally spherical or elliptical shape, the body 10 being formed of a suitable material having a relatively high temperature coefficient of resistance. A pair of spaced-apart electrodes 11 and 12 are embedded in the body 10 in parallel relationship, the electrodes 11 and 12 also serving as connecting leads for providing connections to circuitry or components which are to be controlled or otherwise altered in a desired manner by thermally-induced variations in the resistance value of the thermistor body 10. The electrodes 11 and 12 are usually composed of a material such as platinum or one or more alloys of platinum selected to have high electrical conductivity and low thermal conductivity. Low thermal conductivity is desired in order to minimize thermal losses from the body 10 by conduction through these leads.

A sheath 13 coats substantially the entire exterior surface of the body 10 and is formed of a good electrical insulating material having, in addition, good thermal conductance. The sheath 13 is typically composed of glass because this material is relatively inexpensive and characteristically provides both good electrical insulation and good thermal conductance. Of course, the sheath may also be composed of other suitable materials such as one or more types of thermosetting resins or ceramics.

The thermistor as received from a thermistor manufacturer is usually of the aforedescribed directly heated type in that it comprises a thermistor body 10 and connecting leads 11 and 12; the body 10 being initially sheathed by a relatively thin coating possessing the same properties and thus being typically formed of the same material as the sheath 13. This thin coating is illustrated by dashed lines in FIGURE 1, is referred to by the numeral 14, and is normally of sufficient thickness to provide an adequate electrical insulation of the thermistor body for most commercial applications.

A directly heated thermistor received from a thermistor manufacturer is often converted into one of an indirectly heated type through the addition of at least one, and typically two, spaced-apart and generally parallel heater wires 15 and 16. The heater wires 15 and 16 are usually composed of a material having high resistance or low electrical conductivity and a high thermal conductivity for obvious reasons. Nichrome, an alloy of nickel and chromium, is often used for these heater wires because this material provides a satisfactory compromise between the two generally inconsistent properties of low electrical conductivity and high thermal conductivity.

To convert a directly heated thermistor into a conventional indirectly heated thermistor, an additional layer or additional layers of sheath material are applied to the heater wires 15 and 16 and to the sheath 14 by, for example, the repeated application of molten glass coatings to both the wires and the sheath. Since the additional sheath material is also conventionally applied to the thermistor body 10, the thickness of sheath material which finally coats the body 10 is usually at least twice that of the sheath 14. By virtue of its greater volume, the sheath 13 forms a thermal sink of significant size which absorbs a significant amount of the thermal energy radiated by the heater wires. As a consequence of having this relatively large heat sink in the electrical insulation covering of the thermistor body, prior art thermistor devices have been found to exhibit considerable thermal inertia to changes in thermal energy caused by variations in current flow through the heater wires.

In those instances where, for example, the thermistor device is employed as a means for converting a variation in effective heater current amplitude to a change in resistance, it is desirable that the thermistor device have as high a speed of response as possible to temperature variations in the heater wires. As a general proposition, the greater the thermal inertia of the thermistor device, the slower its speed of response to changes in thermal energy engendered by changes in heater current amplitude.

Figure 2:
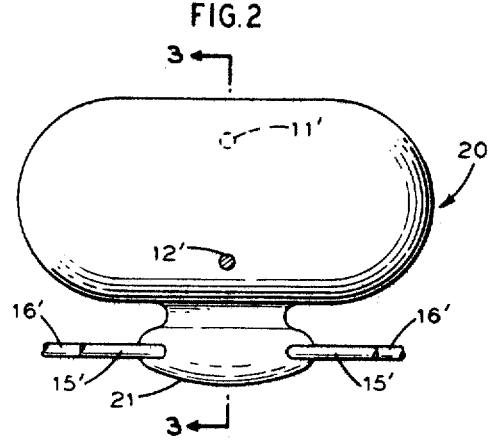
FIGURE 2 is an end view of a thermistor constructed in accordance with the principles of this invention.
Figure 3:
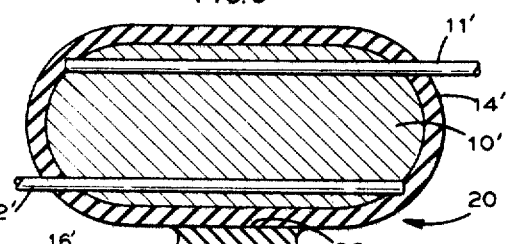
FIGURE 3 is a full sectional side view taken along section lines 3—3 in FIGURE 2.
Figure 4:
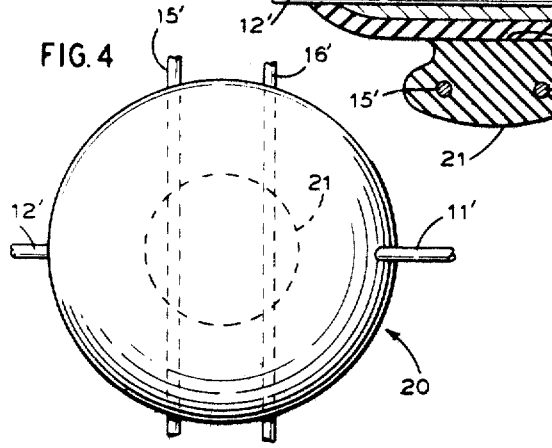
FIGURE 4 is a plan view of the thermistor device shown in FIGURE 2.

Referring now to FIGURES 2 and 3, there is shown a thermistor device 20 constructed in accord with this invention, wherein like elements in FIGURE 1 are referred to in FIGURES 2 and 3 by like numerals but with a prime symbol (') added to such numerals. The thermistor device 20 also comprises a thermistor body 10', a pair of electrodes and connecting leads 11' and 12' embedded in the body 10' and a sheath 14' covering the body 10'; the nature and purposes of each of these elements having been previously explained. It may be noted that these four elements, the two electrodes, the body and the sheath, arranged as depicted in FIGURE 3, form a prior art directly heated thermistor of conventional type.

The heater wires 15' and 16' of the device 20 are however, embedded in close parallel relationship in a bead-like element 21 of substantially oval shape that depends from a discrete portion of the exterior surface of the sheath 14'. The bead 21 should also possess the properties of good electrical insulation and good thermal conductance and, therefore, may be composed of the same material as the sheath 14', for example, glass. The bead 21 may be bonded to, or otherwise joined, in good thermal conducting relationship to a discrete surface portion of the sheath 14' to form a thermal conductive interface 22 between the bead and the sheath and, hence, between the bead and an adjacent section of the thermistor body. Typically, the area of the interface 22 is no larger than one-third the total surface area of the sheet 14′.

Because of its relatively small volume and mass, the bead 21 appears as a negligible heat sink to heat flow between the heater wires 15′ and 16′ and the interface 22, and therefore, the thermal inertia of the bead 21 is also practically negligible.

In view of the foregoing, it should be apparent that the thermal inertia of the thermistor device of his invention is made minimal and, conversely, its speed of response is extremely high compared with comparable prior art devices. For instance, it has been found through experimentation that the thermistor device 20 typically has a speed of response which is twice that of any known prior art thermistor device of the indirectly resistance-heated type.

The bead 21 serves the additional important purpose of allowing the mounting of the two heater wires 15′ and 16′ in close proximity to one another, separated only by that volume of bead material required to adequately electrically insulate one wire from the other. With the heater wires 15′ and 16′ in such proximity, the thermal conductive paths between both heater wires and the interface 22 are practically common. Any extraneous matter, such as, for instance, air bubbles, which may be encapsulated in the bead 21, particularly between the heater wires 15′ and 16′ and the interface 22, will therefore appear as common sources of thermal loss to both heater wires. Similarly, deviations in thickness of the section of the sheath 14′ that is interposed between the interface 22 and the coresponding surface portion of the body 10′ and, thus, lies in a plane that is substantially perpendicular to the direction of heat conduction, will also appear as common sources of thermal loss to heat radiated by the heater wires. Accordingly, the thermal conductive characteristics of the conductive paths between the individual heater wires and the corresponding discrete surface portion of the body 10′ are, for all practical purposes, identical.

The bead 21 may be formed integral with or otherwise suitably affixed to the sheath 14′ by any one of several methods. For example, one method entails supporting a molten droplet of bead material, such as glass, on a horizontal surface that is heated to maintain the bead material in a liquid state and then bringing the sheath 14′ with the body 10′ encapsulated therein into contact with this molten droplet. The droplet melts the portion of the sheath surface that it contacts, adheres to that sheath surface portion upon subsequent withdrawal of the sheath from the surface and, under gravitational pull, hangs suspended as an icicle from the sheath. The icicle may then be cooled until it solidifies. Upon subsequent application of heat to the icicle, an increase in icicle surface tension is created which causes the icicle to draw-up into an essentially oval molten bead; there being substantially uniform outward divergence of the sheath from the bead starting at the common interface therebetween. The heater wires, while held taut in parallel, spaced-apart relationship, may then be embedded in this molten bead through the displacement of the sheath with the molten bead depending therefrom toward the heater wires. The parallel, spaced-apart heater wires are maintained embedded in the bead until the bead cools sufficiently to solidify, bonding to the heater wires in the process.

While there has been described what is at present considered to be a preferred embodiment of this invention, it will be obvious to those skilled in the art that various changes and modifications may be made in he instrument without departing from the invention, and it is, therefore, intended to cover all such changes and modifications as fall within the true spirit and scope of the invention.

What is claimed is:

1. An indirectly heated resistor device comprising a body of material having a relatively high temperature coefficient of resistance, a sheath formed of a material having both good electrical insulative and thermal conductive properties covering at least a substantital portion of said body, said sheath including an exterior surface, a bead-like element formed of a material having both good electrical insulative and thermal conductive properties depending from a discrete portion of the exterior surface of said sheath, and at least one heater wire embedded in said element for converting electrical current applied to said one heater wire into thermal energy.

2. The device as claimed in claim 1, wherein a pair of parallel heater wires are embedded in said element, the spacing between said wires being sufficiently close so that a substantially common thermal conductive path is provided between each heater wire and the discrete portion of the exterior surface of said sheath.

3. The device as claimed in claim 1, wherein said sheath and said element are formed of the same material.

4. The device as claimed in claim 3 which additionally includes a pair of electrodes embedded in said body and electrically insulated from one another by said sheath.

5. The device as claimed in claim 2, wherein the surface area of said discrete portion of said sheath is no greater than one-third the total surface area of said sheath.

6. An indirectly heated resistor device comprising a body of material having a high temperature coefficient of resistance, a sheath formed of a material having good electrical insulative and good thermal conductive properties covering at least a substantial portion of said body, said sheath having an exterior surface, a bead-like element formed of a material having good thermal conductive and good electrical insulative properties depending from a discrete portion of the exterior surface of said sheath, and at least two parallel, spaced-apart heater wires embedded in said element in close proximity to one another, said heater wires converting electrical current flowing therethrough into thermal energy, said element providing a common thermal conductive path to said sheath for thermal energy radiated by either of said heater wires.

7. A thermistor device comprising a body having a high resistance-temperature coefficient and an exterior body surface, a layer of electrical insulation covering at least a substantial portion of the exterior surface of said body and including an exterior surface, a bead of substantially oval shape depending from a discrete portion of the external surface of said layer and comprised of a material having good electrical insulative and good thermal conductive properties, said discrete portion of the layer surface encompassing a surface area that is smaller than the total surface area of said layer, at least two electrodes embedded in said body for providing an electrical connection thereto, and a pair of electrical heating devices having portions thereof embedded in said element, said portions of said heating device embedded in said element being devoid of electrical insulation and positioned in close but electrically insulated relationship by intermediate portions of the element material.

8. The device as claimed in claim 7, wherein the cross-sectional area of said bead is less than the cross-sectional area of said body.

9. An indirectly heated thermistor comprising a first bead of thermistor material having a substantially oval shape and a large negative temperature coefficient of resistance, a layer of insulation substantially uniformly encapsulating the thermistor bead, a second bead of substantially oval shape composed of a material having thermal conductive and electrical insulative characteristics, a portion of the exterior surface of said second bead being joined in thermal conductive relationship to said first bead by a discrete portion of the exterior surface of said layer, the exterior surfaces of said layer and said second bead contiguous to said discrete portion of said layer diverging from said discrete portion, and a pair of heater wires embedded in said second bead in spaced-apart, substantially parallel relationship, said second bead being of sufficiently small size to provide (1) a negligible heat sink and (2) a common thermal conductive path for heat radiated by current flow through each of said heater wires.

10. An indirectly thermal-controlled electrical resistance device comprising, a body of material having a relatively high temperature coefficient of resistance and a layer of insulating material covering at least a portion of said body, a globular element for conducting thermal energy to said thermistor element and disposed in juxtaposed relationship thereto, the globular element being of smaller size than said body and having a portion thereof contiguous to said layer joined to said layer, and thermal-control means mounted on said globular element.

11. The device as claimed in claim 10, wherein said layer and said globular element are composed of the same material.

12. The device as claimed in claim 11, wherein said portion of said globular element is fused to said layer.

References Cited
UNITED STATES PATENTS

| | | | |
|---|---|---|---|
| 2,339,029 | 1/1944 | Pearson | 338—22 |
| 2,505,066 | 4/1950 | Rulison | 338—22 |

REUBEN EPSTEIN, *Primary Examiner.*